United States Patent
Cheng (10) Patent No.: US 10,622,879 B2
(45) Date of Patent: Apr. 14, 2020

(54) CONTROL MODULE WITH ACTIVE SNUBBER AND RELATED FLYBACK POWER CONVERTING DEVICE

(71) Applicant: Infinno Technology Corp., Hsinchu County (TW)

(72) Inventor: Yuan-Kai Cheng, Hsinchu County (TW)

(73) Assignee: Infinno Technology Corp., Hsinchu County (TW)

( * ) Notice: Subject to any disclaimer, the term of this patent is extended or adjusted under 35 U.S.C. 154(b) by 0 days.

(21) Appl. No.: 15/491,983

(22) Filed: Apr. 20, 2017

(65) Prior Publication Data
US 2017/0310226 A1 Oct. 26, 2017

Related U.S. Application Data

(60) Provisional application No. 62/324,902, filed on Apr. 20, 2016.

(51) Int. Cl.
*H02M 1/00* (2006.01)
*H02M 3/335* (2006.01)

(52) U.S. Cl.
CPC ............ *H02M 1/00* (2013.01); *H02M 3/335* (2013.01); *H02M 2001/0006* (2013.01)

(58) Field of Classification Search
CPC ... H02M 2001/0006; H02M 2001/335–33592; H02M 1/00
See application file for complete search history.

(56) References Cited

U.S. PATENT DOCUMENTS

| 5,508,903 A | 4/1996 | Alexndrov |
| 6,473,318 B1 | 10/2002 | Qian |
| 9,252,676 B2 * | 2/2016 | Yang ................. H02M 3/33576 |
| 2011/0157922 A1 * | 6/2011 | Konecny ........... H02M 3/33515 363/21.12 |
| 2013/0100719 A1 * | 4/2013 | Tzeng ..................... H02M 1/32 363/56.01 |
| 2015/0003121 A1 * | 1/2015 | Yang ................. H02M 3/33523 363/21.17 |
| 2016/0190942 A1 * | 6/2016 | Kikuchi ............ H02M 3/33507 363/21.14 |
| 2016/0344294 A1 * | 11/2016 | Zhang ..................... H02M 1/36 |

FOREIGN PATENT DOCUMENTS

| TW | 201236336 A1 | 9/2012 |
| TW | 201249084 A1 | 12/2012 |

* cited by examiner

*Primary Examiner* — Gary L Laxton
*Assistant Examiner* — Rafael O. De León Domenech
(74) *Attorney, Agent, or Firm* — Winston Hsu (57) ABSTRACT

A control module for a flyback power converting device is coupled between a primary side winding of the flyback power converting device and a power end and includes a switch unit coupled to the primary side winding; wherein the control module conducts a connection between the primary side winding and the power end when the switch unit is disconnected; wherein the power end is able to provide an operation current to the control module.

12 Claims, 6 Drawing Sheets

CONTROL MODULE WITH ACTIVE SNUBBER AND RELATED FLYBACK POWER CONVERTING DEVICE

CROSS REFERENCE TO RELATED APPLICATIONS

This application claims the benefit of U.S. Provisional Application No. 62/324,902 filed on 2016 Apr. 20, the contents of which are incorporated herein in their entirety.

BACKGROUND OF THE INVENTION

1. Field of the Invention

The present invention relates to a control module with an active snubber and related flyback power converting device, and more particularly, to a control module utilizing integrated circuits to reduce voltage spikes in the flyback power converting device and related flyback power converting device.

2. Description of the Prior Art

Comparing to other types of power convertor, flyback power converters not only equip with a compact circuit structure and higher power converting efficiency, but also are able to highly efficiently provide multiple current outputs. Thus, the flyback power converters are widely adopted in various kinds of circuits.

Figure 1:
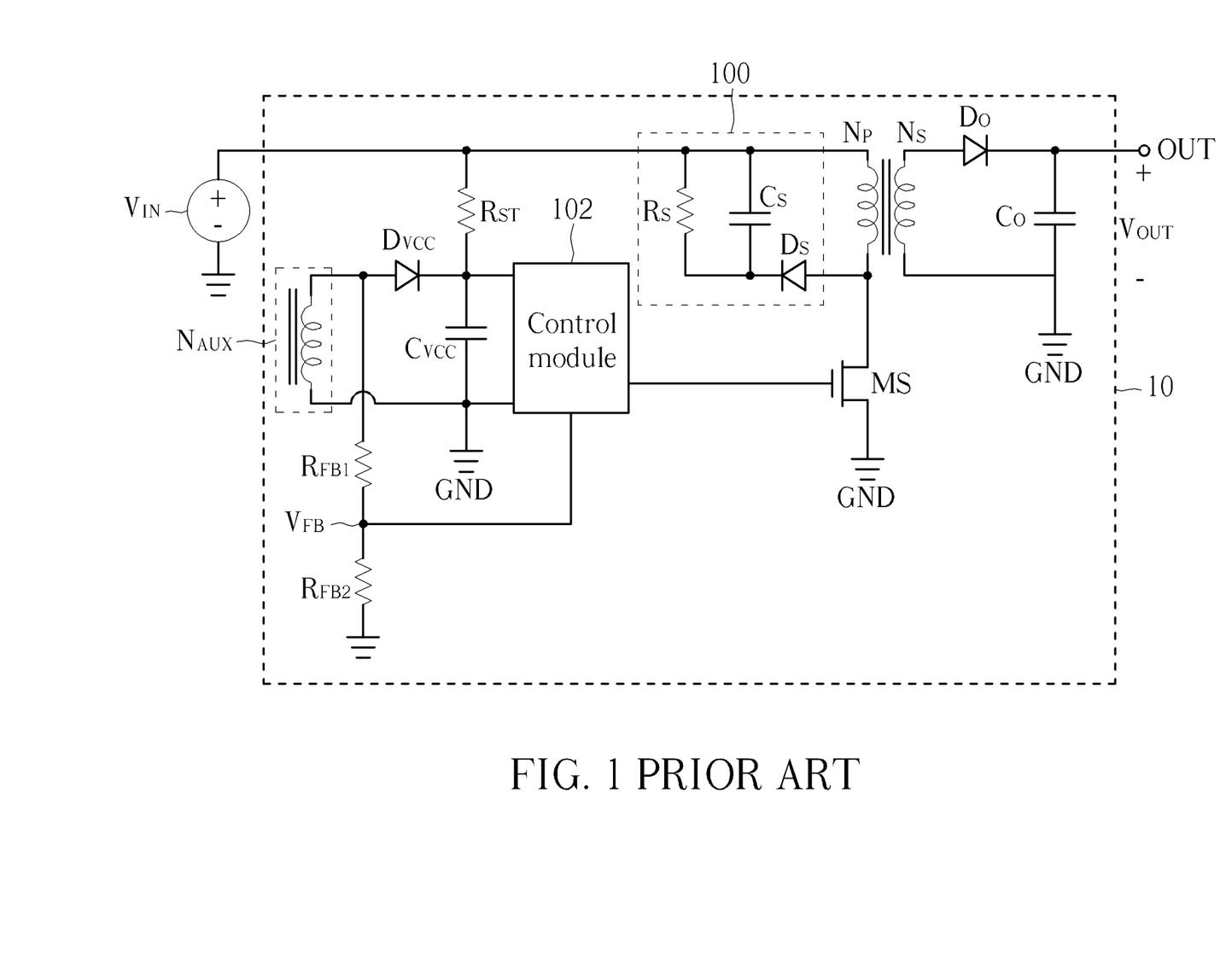
FIG. 1 is a schematic diagram of a conventional flyback power converter.

Please refer to FIG. 1, which is schematic diagram of a conventional flyback power converter 10. As shown in FIG. 1, the flyback power converter 10 comprises a power-on resistor $R_{ST}$, a snubber 100, a primary side winding $N_P$, a secondary side winding $N_S$, a switch transistor MS, a control module 102, an auxiliary winding $N_{AUX}$, diodes $D_{VCC}$ and $D_O$, capacitors $C_{VCC}$ and $C_O$, and feedback resistors $R_{FB1}$ and $R_{FB2}$. When the flyback power convertor 10 connects to an external power $V_{IN}$, the external power $V_{IN}$ charges the capacitor $C_{VCC}$ through the power-on resistor $R_{ST}$, to increase a power voltage VCC of the control module 102 and to turn on the control module 102. Next, the control module 102 periodically conducts the switch transistor MS, to make the primary side winding $N_P$ store energy from the external power $V_{IN}$ and transmit energy to the secondary side winding $N_S$. The secondary side winding $N_S$ therefore can charge the output end OUT. The auxiliary winding $N_{AUX}$ is electrically coupled to the secondary side winding $N_S$ and utilized to generate a feedback voltage $V_{FB}$, which is positively proportional to a voltage $V_{OUT}$ of the output end OUT via the resistors $R_{FB1}$ and $R_{FB2}$. According to the feedback voltage $V_{FB}$, the control module 102 adjusts the period of conducting the switch transistor MS, to precisely control the voltage $V_{OUT}$. The auxiliary winding $N_{AUX}$ not only generates the feedback voltage $V_{FB}$ but also charges the capacitor $C_{VCC}$ through the diode $D_{VCC}$, to reduce the power consumption of the flyback power converter 10. When the control module 102 turns off the switch transistor MS, a leakage inductance of the primary side winding $N_P$ generates a voltage spike on the voltage of the drain of the switch transistor MS. In order to avoid the voltage spike damaging the switch transistor MS or the control module 102, the flyback power converter 10 adopts the snubber 100 comprising a resistor $R_S$, a capacitor $C_S$, and a diode $D_S$ to mitigate the voltage spike.

In addition, U.S. Pat. No. 6,473,318 "LEAKAGE ENERGY RECOVERING SYSTEM AND METHOD FOR FLYBACK CONVERTER", U.S. Pat. No. 6,980,447 "ACTIVE SNUBBER CIRCUIT FOR SYNCHORNOUS RECTIFIER", US 2006/0062027 "HIGH EFFICIENCY SWITCHING POWER CONVERTER" and US 2009/0268489 "FLYBACK CONVERTER HAVING AN ACTIVE SNUBBER", Taiwan patents TW 201236336 "POWER CONVERTER AND CONTROL METHOD OF POWER CONVERTER" and TW 201434259 "Control Circuit of Flyback Power Converter" and China patent CN 104993682 "Flyback Converter Leakage Inductor Absorption and Feedback Circuit" respectively provide different methods to mitigate the voltage spike generated by the leakage inductance of the primary side winding $N_P$.

However, the conventional flyback power converter needs lots of external components. For example, all of the power-on resistor $R_{ST}$, the snubber 100, the primary side winding $N_P$, the secondary side winding $N_S$, the switch transistor MS, the auxiliary winding $N_{AUX}$, the diodes $D_{VCC}$ and $D_O$, the capacitors $C_{VCC}$ and $C_O$, and the resistors $R_{FB1}$ and $R_{FB2}$ of the flyback power converter 10 shown in FIG. 1 are realized $R_{FB2}$ by the external components. Large number of external components greatly increases the manufacture cost of the flyback power converter. Although U.S. Pat. No. 8,724,344 "METHOD AND APPARATUS FOR HIGH-SIDE INPUT WINDING REGULATION" discloses a power converter with reduced number of components, it cannot mitigate the voltage spike. Thus, how to reduce the number of the external components in the flyback power converter and mitigate the voltage spike at the same time becomes a topic to be discussed.

SUMMARY OF THE INVENTION

In order to solve the above issue, the present invention provides a control module utilizing integrated circuits to reduce voltage spikes in the flyback power converting device and related flyback power converting device.

In an aspect, the present invention discloses a control module for a flyback power converting device. The control module is coupled between a primary side winding of the flyback power converting device and a power end and comprises a switch unit coupled to the primary side winding; wherein the control module conducts a connection between the primary side winding and the power end when the switch unit is disconnected; wherein the power end is able to provide an operation current to the control module.

In another aspect, the present invention discloses A flyback power converting device, comprising a primary side winding; a secondary side winding; a switch unit coupled to the primary side winding; and a control module coupled between the primary side winding and a power end for conducting a connection between the primary side winding and the power end when the switch unit is disconnected; wherein the power end is able to provide an operation current to the control module.

These and other objectives of the present invention will no doubt become obvious to those of ordinary skill in the art after reading the following detailed description of the preferred embodiment that is illustrated in the various figures and drawings.

DETAILED DESCRIPTION

In the following examples, control modules of flyback power converting devices utilize integrated circuits to reduce voltage spikes on voltages across a switch unit in the flyback power converting device. Under such a condition, a number of external components in the flyback power converting device can be greatly decreased and the manufacture cost of the flyback power converting device is therefore reduced. The present invention is particularly shown and described with respect to at least one exemplary embodiment accompanied by drawings. Words utilized for describing connections between two components such as 'couple' and 'connect' should not be taken as limiting a connection between the two components to be directly coupling or indirectly coupling.

Figure 2:
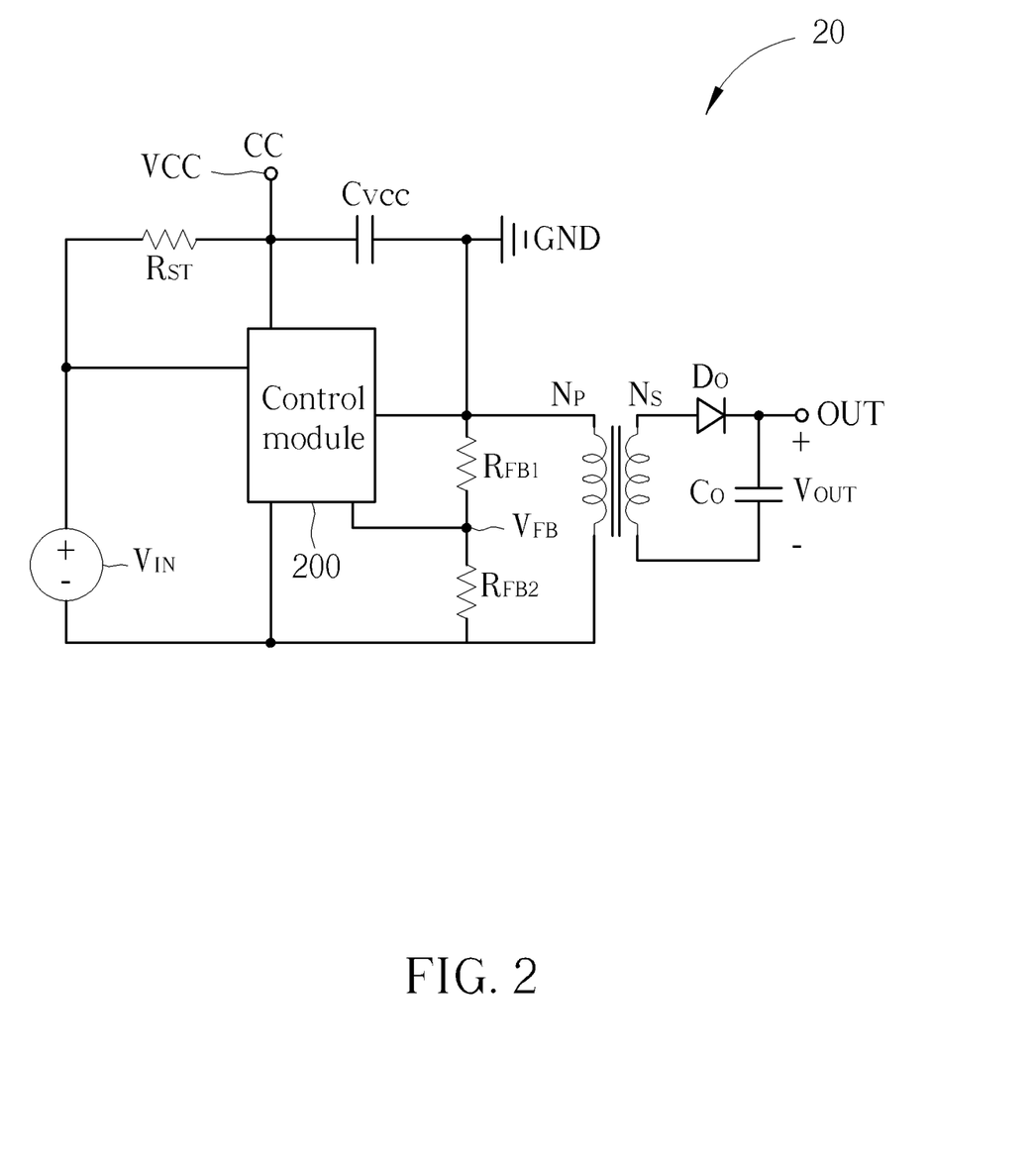
FIG. 2 is a schematic diagram of a flyback power converting device according to an example of the present invention.

Please refer to FIG. 2, which is a schematic diagram of a flyback power converting device 20 according to an example of the present invention. The flyback power converting device may be a charger of consumer electronic products such as smart phones, tablets and notebooks. As shown in FIG. 2, the flyback power converting device 20 comprises a power-on resistor $R_{ST}$, a primary side winding $N_P$, a secondary side winding $N_S$, a control module 200, capacitors $C_{VCC}$ and $C_O$, and resistors $R_{FB1}$ and $R_{FB2}$. During operations of the flyback power converting device 20, the control module 200 periodically makes the primary side winding $N_P$ store energy from an external power $V_{IN}$ and transmit energy to the secondary side winding $N_S$. The secondary side winding $N_S$ therefore can charge an output end OUT. The transistors $R_{FB1}$ and $R_{FB2}$ are utilized to generate a feedback voltage $V_{FB}$ positively proportional to a voltage $V_{OUT}$ of the output end OUT. According to the feedback voltage $V_{FB}$, the control module 200 adjusts a duty cycle of the primary side winding $N_P$ storing the energy and precisely controls the voltage $V_{OUT}$. When the control module 200 stops the primary side winding $N_P$ storing the energy, a leakage inductance of the primary side winding $N_P$ generates a voltage spike and the circuit components in the control module 200 may be damaged by the voltage spike. In order to avoid the voltage spike damaging the control module 200, the control module 200 utilizes the energy generated by the leakage inductance of the primary side winding $N_P$ to charge the capacitor $C_{VCC}$, which is coupled between a power end CC and the ground GND and is able to provide an operation current to the control module 200, when stopping the primary side winding $N_P$ storing the energy. That is, the control module 200 can not only reduce the voltage spike but also utilize the energy generated by the leakage inductance of the primary side winding $N_P$ as the operation energy of itself. In addition, the control module 200 is realized by integrated circuits. Under such a condition, the number of external components in the flyback power converting devices 20 is decreased and the manufacture cost of the flyback power converting device 20 is therefore reduced.

Figure 3:
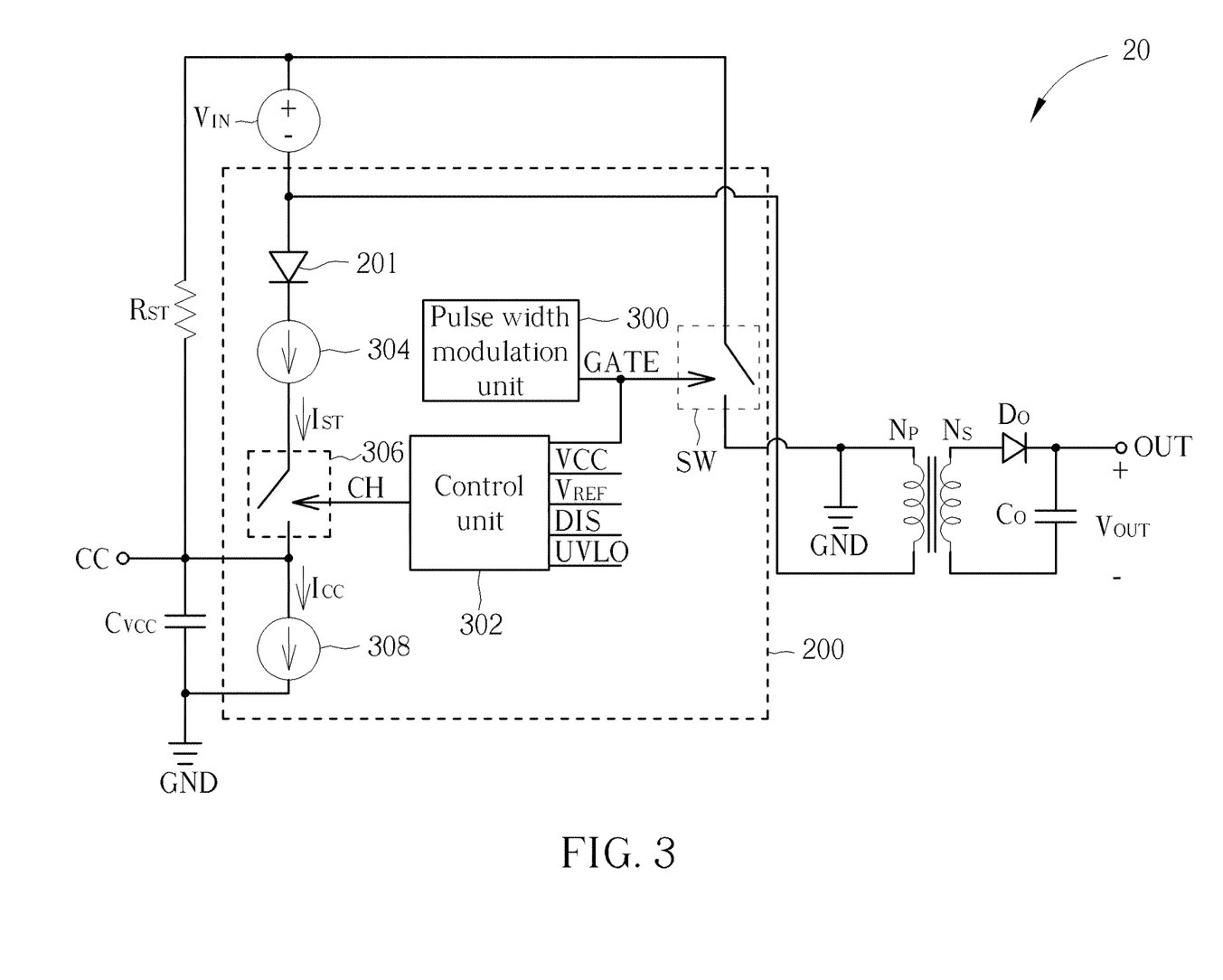
FIG. 3 is a schematic diagram of an embodiment of the control module shown in FIG. 2.

Please refer to FIG. 3, which is a schematic diagram of an embodiment of the flyback power converting device 20 shown in FIG. 2. FIG. 3 shows the external power $V_{IN}$, the primary side winding $N_P$, the secondary side winding $N_S$, a diode $D_O$ and the capacitors $C_O$ and $C_{VCC}$ and other circuit components that are not directly related to the method of the control module 200 reducing the voltage spike (e.g. the resistors $R_{FB1}$ and $R_{FB2}$) are omitted in FIG. 3. As shown in FIG. 3, the control module 200 comprises a switch unit SW, a current control unit 201, a pulse width modulation unit 300, a control unit 302, a current source 304 and a switch 306. In addition, FIG. 3 shows an active current source 308 representing a current $I_{CC}$ from the power end CC to the control module 200. The current $I_{CC}$ drained by the control module 200 may correlate with the method of the control module 200 reducing the voltage spike. For example, the control module 200 may drain greater current $I_{CC}$ when the voltage spike is greater.

In the example shown in FIG. 3, the switch unit SW is realized by a Metal-Oxide-Semiconductor (MOS). The switch unit SW may be implemented by switch components such as a Bipolar Junction Transistor (BJT), a Uni-junction Transistor (UJT), a Silicon Controlled Rectifier (SCR), or other power components, and is not limited herein. The gate, source, and drain of the switch unit SW are coupled to the pulse width modulation unit 300, the external power $V_{IN}$ and the primary side winding $N_P$, respectively. The pulse width modulation unit 300 is utilized to generate a switch control signal GATE, for adjusting the conduction status of the switch unit SW to start or stop the primary side winding $N_P$ storing energy.

The current control unit 201 is a diode, an active switch or other circuit components capable of controlling currents. The two ends across the current control unit 201 are coupled to the primary side winding $N_P$ and the current source 304, respectively, and the switch unit SW and the current control unit 201 are coupled to the two ends across the primary side winding $N_P$, respectively. In this example, the current control unit 201 is realized by the diode and is not limited herein. The two ends of the diode are an anode coupled to the primary side winding $N_P$ and the external power $V_{IN}$, and a cathode coupled to the current source 304. The current control unit 201 is utilized to prevent a negative voltage, which is generated on the node between the primary side winding $N_P$ and the external power $V_{IN}$ when the switch control signal GATE conducts the switch unit SW, from damaging the current source 304. The switch 306 comprises an end coupled to the power end CC and another end coupled to the current source 304. The current source 304 is coupled to the primary side winding $N_P$ for providing a charging current $I_{ST}$. The control unit 302 is further utilized to generate a charging control signal CH according to the gate control signal GATE for controlling the conducting status of the switch 306. When the switch control signal GATE instructs disconnecting the switch unit SW (i.e. stopping the primary side winding $N_P$ storing energy), the control unit 302 utilizes the current source 304 to charge the capacitor $C_{VCC}$, to reduce the voltage spike generated by the leakage inductance of the primary side winding $N_P$ when the switch unit SW is disconnected. In other words, a combination of the current control unit 201, the control unit 302, the current source 304, the switch 306, and the active current source 308 can be regarded as an active snubber, which is able to not only mitigate the voltage spike generated by the leakage inductance of the primary side winding $N_P$ but also utilize the energy generated by the leakage inductance of the primary side winding $N_P$ to charge the capacitor $C_{VCC}$.

In addition, all of the switch unit SW, the current control unit 201, the pulse width modulation unit 300, the control unit 302, the current source 304, and the switch 306 can be realized by the integrated circuit. Under such a condition, the number of external components in the flyback power converting device 20 decreases. The manufacture cost of the flyback power converting device 20 is reduced, therefore.

As to the detailed operations of the control unit 200 shown in FIG. 3 please refer to the followings. When the flyback power converting device 20 starts operating, the external power $V_{IN}$ charges the capacitor $C_{VCC}$ to generate the appropriate voltage VCC, to make the control module 200 start operating. During operations of the control module 200, the pulse width modulation unit 300 periodically conducts the switch unit SW to make the primary side winding $N_P$ store the energy from the external power $V_{IN}$ and transmit power to the secondary side winding $N_S$, to make the secondary side winding $N_S$ output current to the output end OUT. When the switch control signal GATE disconnects the switch unit SW, the control unit 302 adjusts the charging control signal CH to conduct the switch 306, to charge the capacitor $C_{VCC}$ in a charging period $T_{CH}$ via a current $I_{ST}$ of the current source 304, wherein the current charging the capacitor $C_{VCC}$ equals a difference between currents $I_{ST}$ and $I_{CC}$. Under such a condition, the energy generated by the leakage inductance of the primary side winding $N_P$ when the switch unit SW is disconnected is transmitted to the capacitor $C_{VCC}$ via the current $I_{ST}$ and the voltage spike generated when the switch unit SW is disconnected is therefore mitigated. In addition, the energy of the capacitor $C_{VCC}$ is supplemented by the energy generated by the leakage inductance of the primary side winding $N_P$ when the switch unit SW is disconnected because the current control unit 201, the control unit 302 and the switch 306 is able to one-way conduct the connection between the primary side winding $N_P$ and the power end CC, to make the power end CC able to provide the operation current to the control module 200. The power consumption of the flyback power converting device 20 is effectively reduced, therefore.

In an example, the control unit 302 further adjusts the charging control signal CH according to a discharging indication signal DIS, which indicates a discharging period $T_{DIS}$ of the secondary side winding $N_S$ outputting current to the output end OUT. When the switch control signal GATE disconnects the switch unit SW, the secondary side winding $N_S$ outputs current to the output end OUT within the discharge period $T_{DIS}$. According to the discharging indication signal DIS, the control unit 302 acknowledges the starts and the end of the discharging period $T_{DIS}$ and accordingly limits the charging period $T_{CH}$ not greater than the discharging period $T_{DIS}$. That is, the control unit 302 adjusts the charging control signal CH to disconnect the switch 306 when the discharging indication signal DIS indicates that the secondary side winding $N_S$ stops outputting current to the output end OUT.

In an example, the references of the control unit 302 adjusting the charging control signal CH comprises a power-on signal UVLO, which indicates a relationship between the voltage VCC and a power-on voltage $V_{ON}$. When the power-on signal UVLO indicates that the voltage VCC is smaller than the power-on voltage $V_{ON}$, the control unit 302 adjusts the charging control signal CH to disconnect the switch 306; and when the power-on signal UVLO indicates that the voltage VCC is greater than the power-on voltage VON, the control unit 302 adjusts the charging control signal CH according to the switch control signal GATE and/or the voltage VCC and a reference $V_{REF}$.

Figure 4:
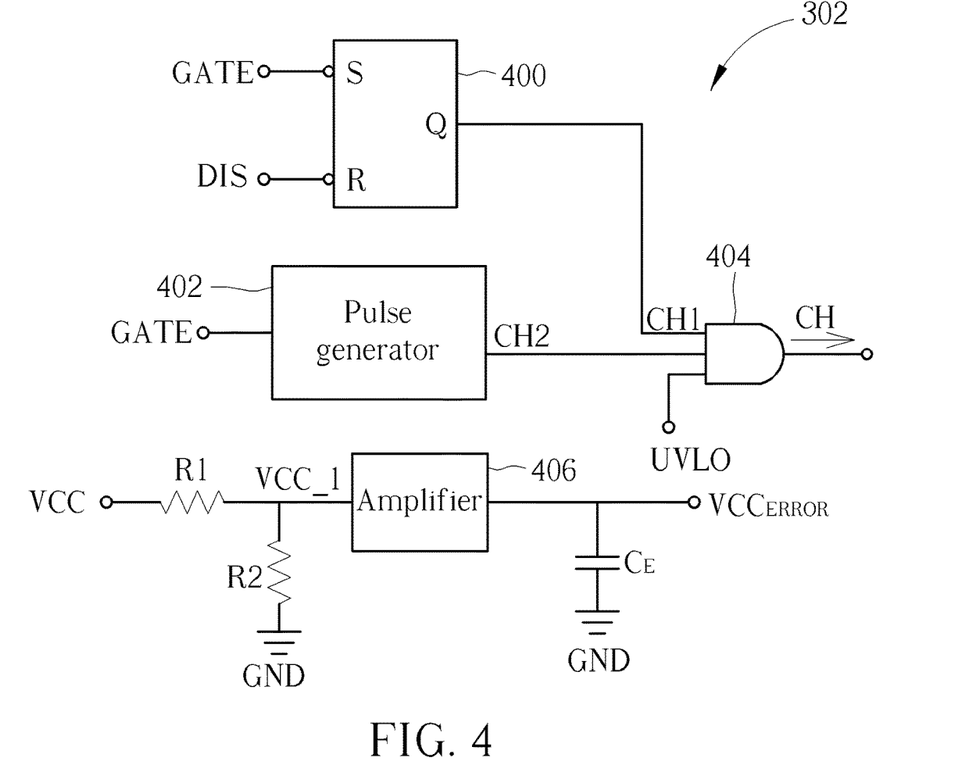
FIG. 4 is a schematic diagram of a control unit shown in FIG. 3.

Please refer to FIG. 4, which is a schematic of an embodiment of the control unit 302 shown in FIG. 3. As shown in FIG. 4, the control unit 302 comprises a SR latch 400, a pulse generator 402, and an AND gate 404. The SR latch 400 includes an input end S receiving an inverting signal of the discharging indication signal DIS, an input end R receiving an inverting signal of the switch control signal GATE, and a signal output end Q outputting a control signal CH1. The pulse generator 402 is utilized to generate a pulse with a constant time period on a control signal CH2 when the switch control signal GATE switches from indicating conducting to disconnecting the switch unit SW (e.g. switching from "1" to "0"). The AND gate 404 comprises 3 input ends respectively receiving the control signal CH1 generated by the SR latch 300, the control signal CON2 generated by the pulse generator 402 and the power-on signal UVLO and is utilized to generate the charging control signal CH.

In addition, the control unit 302 shown in FIG. 4 further comprises an amplifier 406, resistors R1 and R2, and an error capacitor $C_E$. The resistor R1 is coupled between the node between a negative input end of the amplifier 406 and the power end CC, the resistor R2 is coupled between the negative input end of the amplifier 406 and the ground GND. Under such a condition, a voltage VCC_1 received by the negative input end of the amplifier 406 is the product of the voltage VCC and the resistance of the resistor R2 modified a sum of the resistances of the resistors R1 and R2 (VCC_1=VCC×R2/R1+R2). The positive input end of the amplifier 406 is coupled to the reference voltage $V_{REF}$ (not shown in FIG. 4). The amplifier 406 charges the error capacitor $C_E$ coupled to the voltage output end of the amplifier 406 according to the voltage difference between the reference voltage $V_{REF}$ and the voltage VCC_1, to generate an error voltage $VCC_{ERROR}$. That is, the operations of the amplifier 406 and the error capacitor $C_E$ approximate an integrator of integrating the voltage difference between the reference voltage $V_{REF}$ and the voltage VCC_1 to generate the error voltage $VCC_{ERROR}$. According to the error voltage $VCC_{ERROR}$, the control module 20 adjusts the operation method to make the voltage VCC stable at a designed value via adjusting the current $I_{CC}$ drained from the power end CC.

Figure 5:
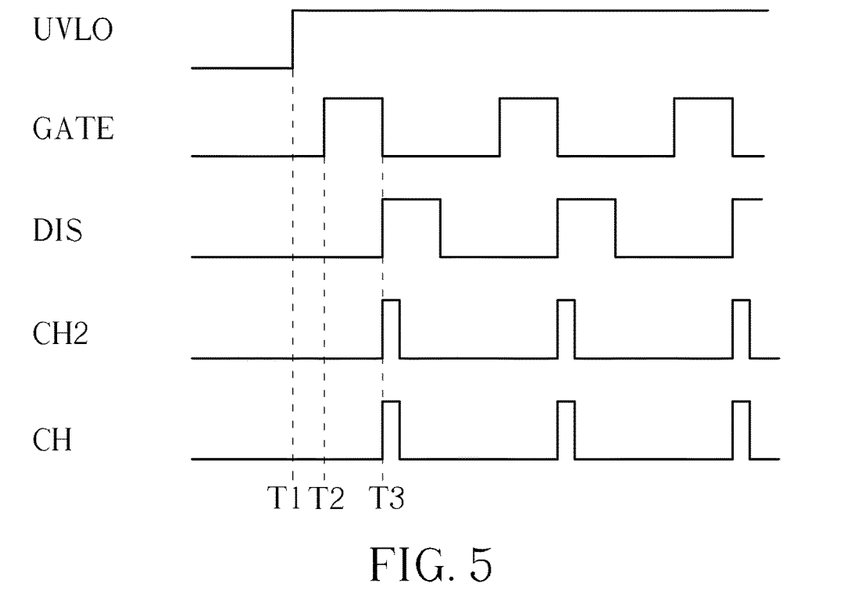
FIG. 5 is a schematic diagram of related signals in the control unit shown in FIG. 4.

As to detailed operations of the control unit 302 generating the charging control signal CH please refer to FIG. 5 which is a schematic diagram of related signals in the control unit 302 shown in FIG. 4. Before a time T1, the voltage VCC is smaller than the power-on voltage $V_{ON}$ and the power-on signal UVLO is at a low logic level to make the charging control signal CH at the low logic level to disconnect the switch 306. At the time T1, the voltage VCC becomes greater than the power-on voltage $V_{ON}$, the flyback converting device 20 comprising the control unit 302 starts operating and the power-on signal UVLO is adjusted to a high logic level. Under such a condition, the references of control unit 302 adjusting the charging control signal CH changes to switch control signal GATE and the discharging indication signal DIS.

At a time T2, the switch control signal GATE switches to the high logic level instructing conducting the switch unit SW and the discharging indication signal DIS switches to the low logic level instructing the secondary side winding $N_S$ stops outputting current to the output end OUT. The SR latch 400 output the control signal CH1 with the low logic level, to adjust the charging control signal CH to the low logic level and to disconnect the switch 306. At a time T3, the switch control signal GATE switches from the high logic level to the low logic level for instructing disconnecting the switch unit SW and the discharging indication signal DIS switches from the low logic level to the high logic level for instructing the secondary side winding $N_S$ starts outputting current to the output end OUT. Under such a condition, the SR latch 400 outputs the control signal CH1 with the high logic level and the AND gate 400 adjusts the charging control signal CH according to the control signal CH2. At the time T3, the pulse generator 402 generates the pulse with the constant period on the control signal CH2 according to the switch control signal GATE, to generate a pulse with the same constant period on the charging control signal CH. As a result, the control unit 302 shown in FIG. 4 is able to accurately generate the charging control signal CH to control the switch 306 even if the operation frequency of the control module 200 increases such that variations of the voltage VCC decreases.

Figure 6:
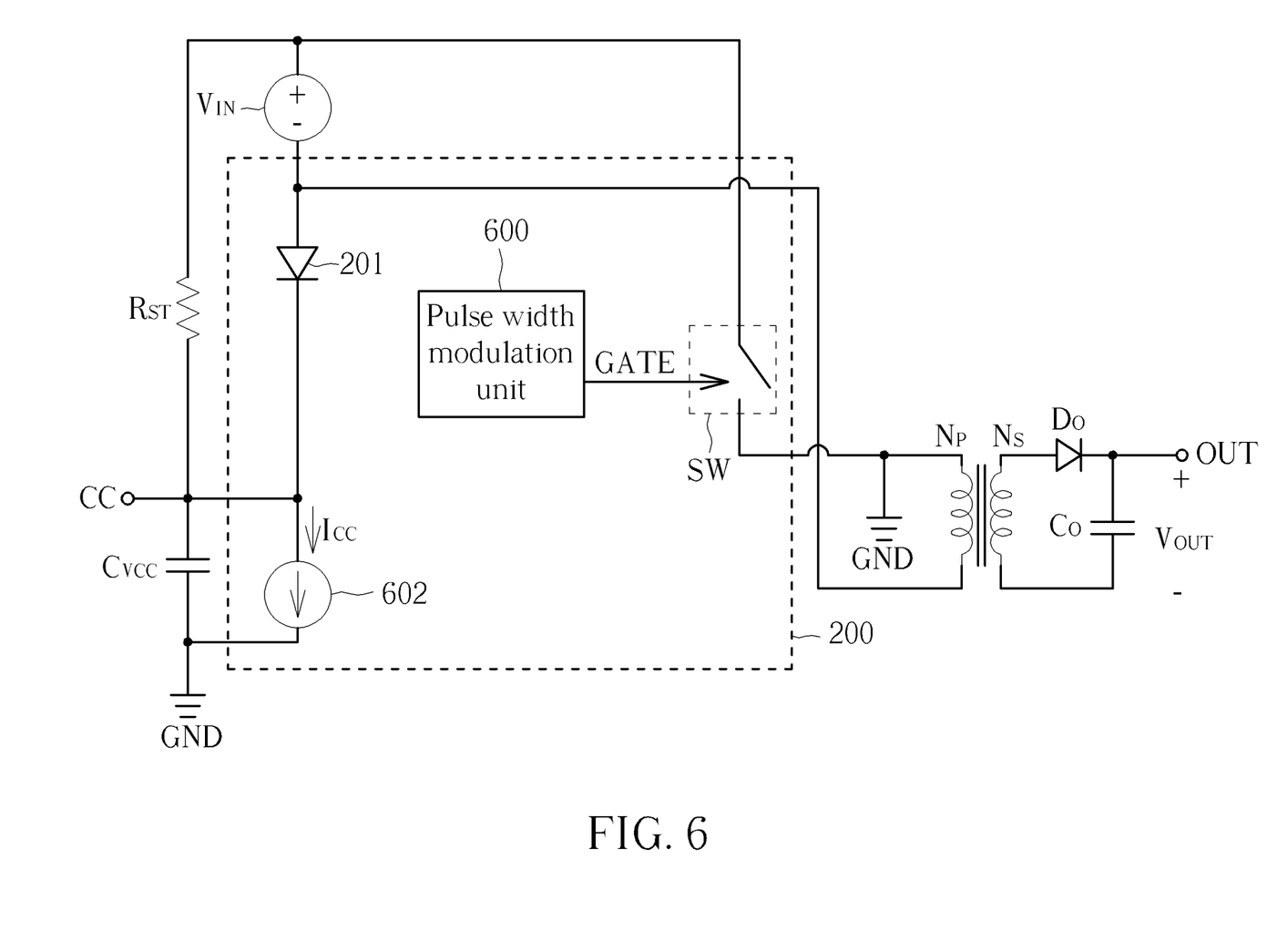
FIG. 6 is a schematic diagram of another embodiment of the control module shown in FIG. 2.

Please refer to FIG. 6, which is a schematic diagram of another embodiment of the control module 200 shown in FIG. 2. FIG. 6 shows the external power $V_{IN}$, the primary side winding $N_P$, the secondary side winding $N_S$, a diode $D_O$ and the capacitors $C_O$ and $C_{VCC}$ shown in FIG. 2 and other circuit components that are not directly related to the method of the control module 200 reducing the voltage spike (e.g. the resistors $R_{FB1}$ and $R_{FB2}$) are omitted in FIG. 6. In the example shown in FIG. 6, the control module 200 comprises a switch unit SW, a pulse width modulation unit 600 and a current control unit 201. In addition, FIG. 6 shows an active current source 608 representing the current $I_{CC}$ from the power end CC to the control module 200.

In FIG. 6, the pulse width modulation unit 600 is utilized to generate a switch control signal GATE, for adjusting the conduction status of the switch unit SW. The current control unit 201 may be a diode, an active switch or other circuit components capable of controlling currents. The two ends across the current control unit 201 are coupled to the primary side winding $N_P$ and the power end CC, respectively, and the switch unit SW and the current control unit 201 are coupled to the two ends across the primary side winding $N_P$, respectively. In this example, the current control unit 201 is realized by the diode and is not limited herein. The two ends of the diode are an anode coupled to the primary side winding $N_P$ and the external power $V_{IN}$, and a cathode coupled to the power end CC.

When the switch control signal GATE instructs disconnecting the switch unit SW, other circuits in the control unit 302 keep operating and draining the current $I_{CC}$ from the power end CC. Under such a condition, the energy generated by the leakage inductance of the primary side winding $N_P$ is transmitted to the power end CC through the current control unit 201 via the current $I_{CC}$ of the control module 200. By configuring the current control unit 201 between the primary side winding $N_P$ and the power end CC, the voltage spike generated by the leakage inductance of the primary side winding $N_P$ is mitigated. In addition, the energy of the capacitor $C_{VCC}$ is supplemented by the energy generated by the leakage inductance of the primary side winding $N_P$ when the switch unit SW is disconnected because the current control unit 201 of the control module 200 is able to one-way conduct the connection between the primary side winding $N_P$ and the power end CC, to make the power end CC able to provide the operation current to the control module 200. The power consumption of the flyback power converting device 20 is effectively reduced, therefore.

Figure 7:
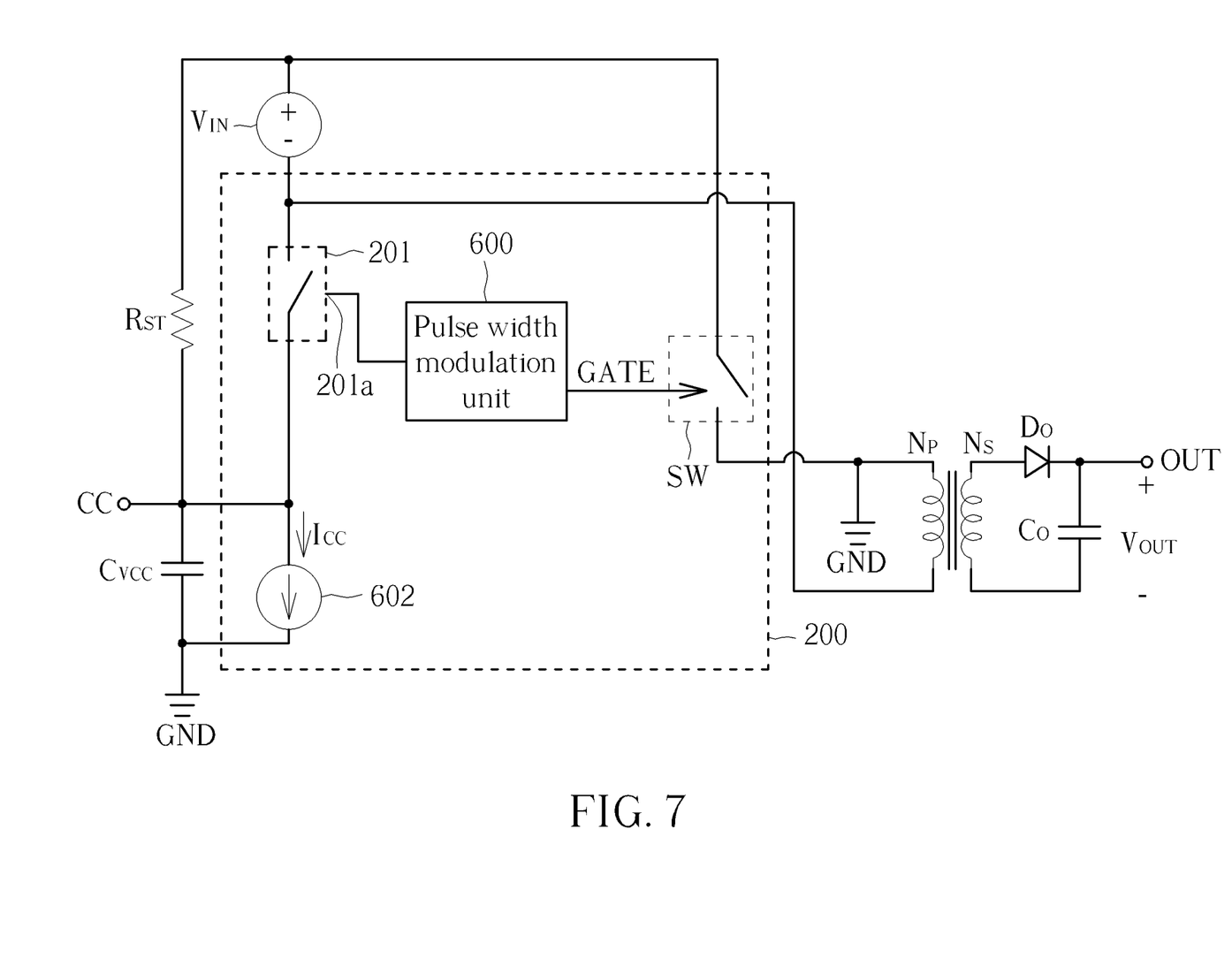
FIG. 7 is a schematic diagram of another embodiment of the control module shown in FIG. 6.

Please refer to FIG. 7, which is a schematic diagram of another embodiment of the control module 200 shown in FIG. 6. Similarly, the two ends across the current control unit 201 are respectively coupled to the primary side winding $N_P$ and the power end CC. Different from the embodiment shown in FIG. 6, the current control unit 201 is realized by an active switch in the embodiment shown in FIG. 7. The current paths between two ends across the active switch is able to be controlled to be conducted or disconnected, to control the direction and the magnitude of current passing the active switch. In addition, the current control unit 201 further comprises a control end 201a. The control end 201a may be coupled to the pulse width modulation unit 600 or other control units (not shown in FIG. 7), to receive control signals and to accordingly conduct or disconnect the current paths between the two ends across the current control unit 201. Thus, the current control unit 201 is able to be conducted when the voltage at the end coupled to the primary side winding $N_P$ is greater than that coupled to the power end CC; otherwise, the current control unit 201 is disconnected. That is, the current control unit 201 provides the current control function similar to that provided by the diode in the example shown in FIG. 6. In other embodiments of the present invention, the current control unit 201 may be conducted and allows the current to be transmitted from the end coupled to the power end CC to the end coupled to the primary side winding $N_P$ under certain conditions (e.g. when the voltage difference across the two ends of the current control unit 201 or the conducting current of the current control unit 201 is smaller than a predefined value) except for allowing the current to be transmitted from the end coupled to the primary side winding $N_P$ to the end coupled to the power end CC. The current control unit 201 in the embodiments of the present invention may be realized by various kinds of circuit component with the current control function, and is not limited herein.

In the flyback power converting device in the above examples, the control module utilizes the energy generated by the leakage inductance of the primary side winding as the energy consumed by the operations of the flyback power converting device. As a result, the voltage spike resulted by the energy of the leakage inductance of the primary side winding and the power consumption of the flyback power converting device can be greatly reduced. In addition, the number of external components realizing the flyback power converting device decreases because the control module in the above examples is implemented by the integrated circuits. The manufacture cost of the flyback power converting device is reduced, therefore.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control module for a flyback power converting device, wherein the control module is coupled between a primary side winding of the flyback power converting device and a power node, and the control module comprises:
   a switch unit coupled to the primary side winding; and
   a capacitor coupled between the power node and a ground to receive and store an energy generated by a leakage inductance, wherein the capacitor generates an operation voltage for the control module;
   wherein the control module conducts a connection between the primary side winding and the power node when the switch unit is disconnected;

wherein the power node is able to provide an operation current to the control module;
wherein the control module further comprises:
a current control unit, wherein two ends of the current control unit are respectively coupled to a first node and the primary side winding, and the switch unit and the current control unit are respectively coupled to two ends of the primary side winding;
a current source coupled between the first node and a second node;
a switch coupled between the second node and the power node for adjusting a connection between the second node and the power node according to a charging control signal; and
a second control unit able to generate the charging control signal according to a switch control signal; wherein the switch control signal controls the switch unit.

2. The control module of claim 1, wherein one end of the switch unit is coupled to the primary side winding and another end of the switch unit is coupled to an external power.

3. The control module of claim 1, wherein the current control unit is a diode; two ends of the diode are an anode and a cathode; the cathode is coupled to the power node; and the anode is coupled to the primary side winding.

4. The control module of claim 1, wherein the current control unit is a diode; two ends of the diode are an anode and a cathode; the cathode is coupled to the first node; and the anode is coupled to the primary side winding.

5. The control module of claim 1, wherein the control unit adjusts the charging control signal according to a relationship between an operating voltage and a reference voltage.

6. The control module of claim 1, wherein the control unit adjusts the charging control signal according to a discharging indication signal that indicates whether a secondary side winding outputs currents to an output end of the flyback power converting device.

7. The control module of claim 1, wherein the second control unit further comprises:
a SR latch including a first input node coupled to the switch control signal; a second input node coupled to a discharging indication signal; and a signal output node for outputting a first control signal;
a pulse generator able to generate a pulse on a second control signal according to the switch control signal; and
a logic gate able to generate the charging control signal according to the first control signal and the second control signal;
wherein the discharging indication signal indicates whether a secondary side winding outputs currents to an output node of the flyback power converting device.

8. The control module of claim 7, wherein the logic gate further adjusts the charging control signal according to a power-on indication signal that indicates a relationship between an operation voltage of the power node and a power-on voltage.

9. The control module of claim 7, wherein the second control unit further comprises:
a first resistor coupled to the power node and a third node;
a second resistor coupled to the third node and a ground;
an amplifier, comprising a first input node coupled to the third node; a second input node coupled to a reference voltage; and a voltage output node; and an error capacitor coupled to the voltage output node of the amplifier;
wherein an error voltage of the voltage output node is utilized to adjust currents drained from the power node to the control module.

10. A flyback power converting device, comprising:
a primary side winding;
a secondary side winding;
a switch unit coupled to the primary side winding; and
a control module coupled between the primary side winding and a power node for conducting a connection between the primary side winding and the power node when the switch unit is disconnected; wherein the control module comprises a capacitor coupled between the power node and a ground to receive and store an energy generated by a leakage inductance, and the capacitor generates an operation voltage for the control module; wherein the power node is able to provide an operation current to the control module,
wherein the control module further comprises:
a current control unit, wherein two ends of the current control unit are respectively coupled to a first node and the primary side winding, and the switch unit and the current control unit are respectively coupled to two ends, of the primary side winding,
a current source coupled between the first node and a second node;
a switch coupled between the second node and the power node for adjusting a connection between the second node and the power node according to a charging control signal; and
a second control unit able to generate the charging control signal according to a switch control signal;
wherein the switch control signal controls the switch unit.

11. The flyback power converting device of claim 10, wherein the flyback power converting device does not comprise an auxiliary winding electrically coupled to the primary side winding.

12. The flyback power converting device of claim 10, wherein the second control unit further comprises:
a SR latch including a first input node coupled to the switch control signal; a second input node coupled to a discharging indication signal; and a signal output node for outputting a first control signal;
a pulse generator able to generate a pulse on a second control signal according to the switch control signal; and
a logic gate able to generate the charging control signal according to the first control signal and the second control signal;
wherein the discharging indication signal indicates whether a secondary side winding outputs currents to an output node of the flyback power converting device.

* * * * *